United States Patent
Mao et al.

(10) Patent No.: US 11,520,968 B2
(45) Date of Patent: Dec. 6, 2022

(54) VERIFICATION PLATFORM FOR SYSTEM ON CHIP AND VERIFICATION METHOD THEREOF

(71) Applicant: MONTAGE LZ TECHNOLOGIES (CHENGDU) CO., LTD., Sichuang (CN)

(72) Inventors: Huimin Mao, Chengdu (CN); Shunlin Li, Chengdu (CN)

(73) Assignee: MONTAGE LZ TECHNOLOGIES (Chengdu) Co., Ltd., Chengdu (CN)

( * ) Notice: Subject to any disclaimer, the term of this patent is extended or adjusted under 35 U.S.C. 154(b) by 36 days.

(21) Appl. No.: 17/363,839

(22) Filed: Jun. 30, 2021

(65) Prior Publication Data

US 2021/0406443 A1 Dec. 30, 2021

(30) Foreign Application Priority Data

Jun. 30, 2020 (CN) .......................... 202010621116.2

(51) Int. Cl.
| | |
|---|---|
| *G06F 30/398* | (2020.01) |
| *G06F 30/33* | (2020.01) |
| *G06F 30/20* | (2020.01) |
| *G06F 30/3308* | (2020.01) |
| *G06F 30/367* | (2020.01) |
| *G06F 11/00* | (2006.01) |

(Continued)

(52) U.S. Cl.
CPC ............ *G06F 30/398* (2020.01); *G06F 30/33* (2020.01); *G01R 31/28* (2013.01); *G06F 11/00* (2013.01); *G06F 30/20* (2020.01); *G06F 30/3308* (2020.01); *G06F 30/367* (2020.01); *G06F 2115/02* (2020.01)

(58) Field of Classification Search
CPC ........ G06F 30/398; G06F 30/33; G06F 30/20; G06F 30/3308; G06F 30/367; G06F 2115/02
USPC ....... 716/106, 111, 136; 703/16, 17; 714/30, 714/33, 732, 733, 734, 741
See application file for complete search history.

(56) References Cited

U.S. PATENT DOCUMENTS

2021/0406442 A1* 12/2021 Mao ...................... G06F 30/398

FOREIGN PATENT DOCUMENTS

| CN | 104899138 A | 9/2015 |
|---|---|---|
| CN | 109684672 A | 4/2019 |

(Continued)

*Primary Examiner* — Phallaka Kik
(74) *Attorney, Agent, or Firm* — Oliff PLC

(57) ABSTRACT

The present application discloses a verification platform for a system on chip and a verification method thereof, the method comprises: generating, by an Universal Verification Methodology test instance, constrained random parameters and random controls, and storing them to a storage area of a bus function model unit; reading, by a software test instance, the random parameters and the random controls through the central processing unit, and configuring a test of the system on chip; storing execution status information of the software test instance in the storage area; reading, by the Universal Verification Methodology test instance, the execution status information, and adjusting constraint condition for generating random parameters and random controls based on the execution status information to exclude having been tested scenarios, and converting the execution status information into coverage data for coverage analysis.

8 Claims, 2 Drawing Sheets

(51) Int. Cl.
*G01R 31/28* (2006.01)
*G06F 115/02* (2020.01)

(56) References Cited

FOREIGN PATENT DOCUMENTS

CN 109783298 A 5/2019
JP 2005346517 A * 12/2005

* cited by examiner

VERIFICATION PLATFORM FOR SYSTEM ON CHIP AND VERIFICATION METHOD THEREOF

REFERENCE TO RELATED APPLICATION

This application claims priority to Chinese Application number CN2020106211162, filed on Jun. 30, 2020, the contents of which are incorporated herein by reference.

TECHNICAL FIELD

The present application generally relates to the field of simulation verification technology, and more particularly to a verification platform for a system on chip and a verification method thereof.

BACKGROUND

SoC (system on chip) technology refers to a technology for integrating all system techniques and corresponding components (such as one or more of: central processing unit(s), bus(es), memor(ies), IP (Intellectual Property) core module(s), Input/Output (I/O) peripheral(s), etc.) into a single chip to provide a system. The SoC technology can effectively reduce product area, improve product performance, reduce product power consumption and improve product reliability, so it has been widely used. However, due to the high cost of the chip, in order to ensure the functionality and performance of the SoC chip, there is a need of a large amount adequate verification before chip taping out.

A verification method of the SoC chip in the prior art is to perform test through a CPU, which requires to run a software program on the CPU. The software program configures a tested object, controls generation of stimulus, and coordinates a simulation. However, these are not random on the software level. Therefore, it is only possible to perform a direct test, which is provided with fixed configuration and stimulus, and performs a fixed process on the tested object. In order to reach the test coverage, it is needed to build a large number of direct tests, which is time-consuming and affects the simulation progress. Furthermore, the direct tests of some scenarios are extremely difficult or even impossible to be built, which affects the improvement of the test coverage. Moreover, since the software program cannot dynamically control the verification platform, each time a verification platform configuration is set, it needs to be recompiled, which affects the efficiency of the simulation.

SUMMARY OF THE INVENTION

An object of the present application is to provide a verification platform and verification method for a system on chip, which realizes a constrained random simulation on the software level, and improves the execution coverage of software program.

An embodiment of the present application discloses a verification platform of a system on chip, the platform comprises a bus function model unit connected to a bus, wherein the bus function model unit is provided with a storage area, a central processing unit accesses the storage area through the bus, and an Universal Verification Methodology test instance directly accesses the storage area. The Universal Verification Methodology test instance generates constrained random parameters and random controls and saves them to the storage area, and a software test instance reads the constrained random parameters and the random controls through the central processing unit and configures a test of the system on chip, and execution status information of the software test instance is stored in the storage area through the central processing unit and is read by the Universal Verification Methodology test instance.

In an embodiment, the execution status information comprises information on whether the software test instance is executed successful, information on whether there is an error during execution and corresponding error information, a feedback from the tested system on chip during execution, an execution coverage of the software code or any combination thereof.

In an embodiment, the system on chip comprises the central processing unit, a plurality of IP core modules and the bus, wherein each IP core module is connected to the bus respectively, and the central processing unit is connected to the bus.

In an embodiment, the bus function model unit and an IP core module are connected to the bus through a selection switch, and interface protocols of the bus function model unit and the IP core module are the same and conform to an interface protocol of the bus.

In an embodiment, the bus function model unit has an interface that conforms to the bus protocol and is directly connected to the bus.

In an embodiment, the Universal Verification Methodology test instance reads the execution status information, adjusts constraint condition for generating random parameters and random control based on the execution status information to exclude scenarios that have been tested, and converts the execution status information into coverage data for coverage analysis.

Another embodiment of the present application further discloses a verification method of a system on chip, the method comprises:

generating, by an Universal Verification Methodology test instance, constrained random parameters and random controls, and storing them to a storage area in a bus function model unit;

reading, by a software test instance, the constrained random parameters and the random controls through a central processing unit, and configuring a test of the system on chip;

storing execution status information of the software test instance in the storage area; and reading, by the Universal Verification Methodology test instance, the execution status information, and adjusting constraint condition for generating random parameters and random controls based on the execution status information to exclude scenarios that have been tested.

In an embodiment, the method may comprise converting the execution status information into coverage data for coverage analysis.

The present application achieves constrained random tests on software level through the storage area of the bus function model unit, and can collect the execution status information of the software test instance to realize coverage analysis, and ensure that the test coverage requirements are satisfied.

BRIEF DESCRIPTION OF THE FIGURES

Non-limiting and non-exhaustive embodiments of the present application are described with reference to the following drawings, where like reference numerals refer to like parts throughout the various views unless otherwise specified.

DETAILED DESCRIPTION

Various aspects and examples of the present application will now be described. The following description provides specific details for a thorough understanding and enabling description of these examples. Those skilled in the art will understand, however, that the disclosure may be practiced without many of these details.

Additionally, some well-known structures or functions may not be shown or described in detail, so as to avoid unnecessarily obscuring the relevant description.

In order to make the objects, technical solutions and advantages of the present application more clear, embodiments of the present application will be further described in detail below with reference to the accompanying drawings.

Figure 1:
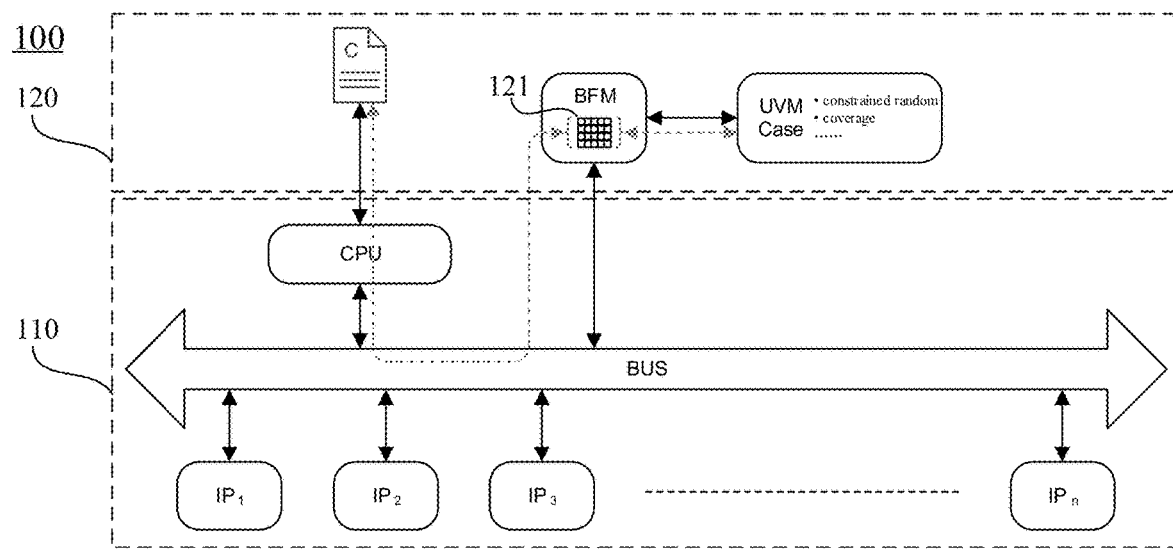
FIG. 1 shows a schematic diagram of a verification platform for a system on chip according to an embodiment of the present application.

FIG. 1 shows a schematic diagram of a verification platform 100 according to an embodiment of the present embodiment. The verification platform 100 comprises a design to be tested 110 and a simulation environment 120. The design to be tested 110 comprises a system on chip that needs to be verified, and the function of the system on chip 110 is tested through the simulation environment 120. The system on chip to be verified comprises a central processing unit (CPU), a plurality of IP core modules (e.g., $IP_1$ to $IP_n$) and a bus, each of the IP core modules $IP_1$ to $IP_n$ is respectively connected to the bus, each of the IP core modules $IP_1$ to $IP_n$ is a component with a particular function, for example, $IP_1$ is a universal serial bus (USB) controller, $IP_2$ is a video decoder, $IP_3$ is an audio Decoder, etc. It should be understood that the IP (Intellectual Property) core module is a pre-designed and verified component with a certain function for selection and integration by chip designers. Generally, there are a plurality of IP core modules integrated in a SoC. The IP core module is not limited to the above-exemplified components, but may also be components with other specific functions, which are well-known to those skilled in the art and will not be repeated here. The simulation environment 120 comprises a software test instance, an Universal Verification Methodology (UVM) test instance and a bus function model unit (BFM), the software test instance is software code written in C language (C program), and the Universal Verification Methodology test instance is test code written in Universal Verification Methodology.

In an embodiment, the bus function model unit has a protocol that conforms to the bus and is directly connected to the bus, for example, the Advanced MicroController Bus Architecture (AMBA) Protocol, the Open Core Protocol (OCP), etc. In an embodiment, the Universal Verification Methodology test instance directly accesses a storage area in the bus function model unit. In an embodiment, the storage area 121 is provided in the bus function model unit, the storage area may be also implemented by means such as registers or associative arrays. The central processing unit can access the storage area 121 through the bus, and the Universal Verification Methodology test instance can directly accesses the storage area 121. By adding the bus function model unit in the simulation environment as a bridge of information interaction between the software program and the verification platform, the software-level constrained random simulation is realized.

In this embodiment, the Universal Verification Methodology test instance generates constrained random parameters and random controls, and stores the random parameters and the random controls in the storage area 121, and the software test instance reads the random parameters and the random controls through the central processing unit and configures the system on chip test, typically, the system on chip to be tested is configured with the random parameters, and is tested according to the process of the random controls. The Universal Verification Methodology test instance generates the constraint random parameters and the constraint random controls which are dynamically introduced into the storage area of BFM. After reading the constraint random parameters and the constraint random controls, the software program running on the CPU dynamically configures the tested subject and coordinates the entire simulation to implement the SoC constraint random test, thereby improving the verification coverage of the SoC, and accelerating the verification convergence of the SoC.

Furthermore, execution status information of the software test instance is stored in the storage area through the central processing unit and is read by the Universal Verification Methodology test instance. In an embodiment, the execution status information of the software test instance comprises one or any combination thereof: information on whether the software test instance is executed successful, information on whether there is an error during execution and corresponding error information, a feedback from the tested system on chip during execution, and an execution coverage of the software code (for example, line numbers executed by software program, etc.). Then Universal Verification Methodology test instance can monitor the operating state of the software program in real time and adjust the verification platform according to the operating state, so that the verification platform can be dynamically controlled by software.

In an embodiment, the Universal Verification Methodology test instance collects the execution status information and converts the execution status information into coverage data, and finally displays in a chart form in a coverage analysis tool, so as to visually present the execution coverage of the software program, and then to provide direct test instances for the uncovered point directly, thereby achieving coverage targets.

Figure 2:
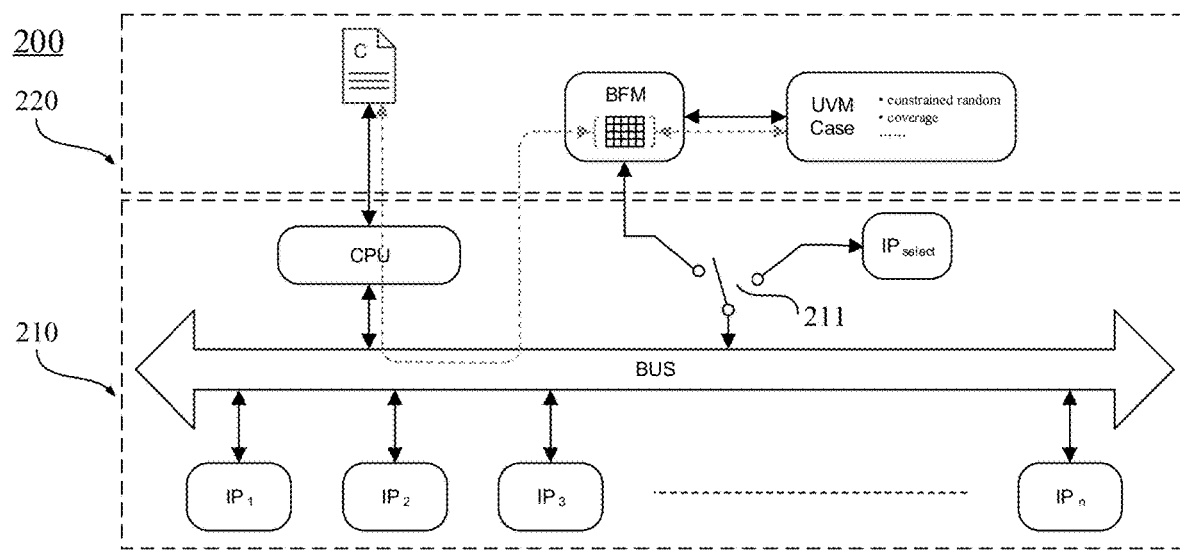
FIG. 2 shows a schematic diagram of a verification platform for a system on chip according to another embodiment of the present application.

FIG. 2 shows a schematic diagram of a verification platform 200 according to another embodiment of the present application. The verification platform 200 is substantially the same as the verification platform 100, the difference between the verification platform 200 and the verification platform 100 is that the verification platform 200 further comprises an IP core module $IP_{select}$, the IP core module $IP_{select}$ and the bus function model unit are connected to the bus through a selection switch 211, and the IP core module $IP_{select}$ has the same interface protocol as the bus function model unit and conforms to the interface protocol of the bus. The selection switch 211 selectively connects one of the bus function model unit and the IP core module $IP_{select}$ to the bus. In this embodiment, since the IP core module can share the bus interface with the bus function model unit, therefore no extra interface is needed on the bus.

Figure 3:
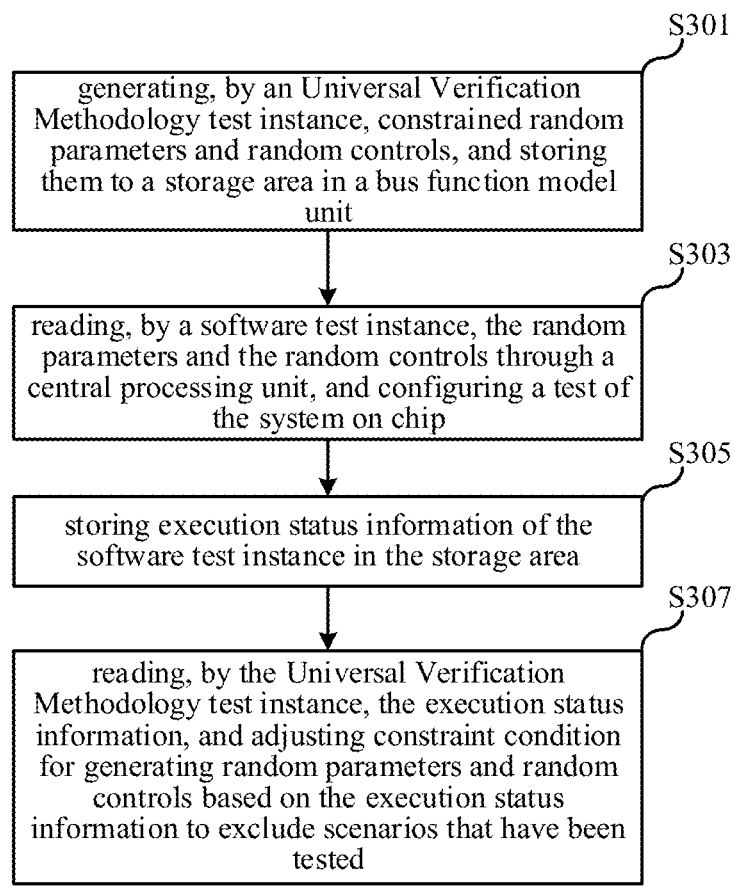
FIG. 3 shows a flow chart of a verification method for a system on chip according to an embodiment of the present application.

Another embodiment of the present application discloses a verification method for a system on chip, and FIG. 3 shows a flow chart of the verification method according to an embodiment of the present embodiment. The method comprises the following steps:

Step S301, generating, by an Universal Verification Methodology test instance, constrained random parameters and random controls, and storing them in a storage area in a bus function model unit.

Step S303, reading, by a software test instance, the constrained random parameters and the random controls through a central processing unit, and configuring a test of the system on chip. Typically, the system on chip to be tested is configured with the random parameters, and is tested according to process of the random controls.

Step S305, storing execution status information of the software test instance in the storage area.

Step S307, reading, by the Universal Verification Methodology test instance, the execution status information, and adjusting constraint condition for generating random parameters and random controls based on the execution status information to exclude scenarios that have been tested.

In an embodiment, the verification method may further comprise converting the execution status information into coverage data for coverage analysis. For the uncovered test points, additional direct tests can be provided to meet the requirements for the test coverage.

In this application, through the storage area of the bus function model unit, the constrained random tests are realized on the software level, and the execution status information of the software program can be collected in real time, which realizes dynamic control of the verification platform and accelerates the coverage rate convergence.

It should be noted that in the application documents of the present application, relational terms such as first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In the application file of this application, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. A verification platform for a system on chip, comprising:
a bus function model unit connected to a bus, wherein the bus function model unit is provided with a storage area, a central processing unit accesses the storage area through the bus, and an Universal Verification Methodology test instance directly accesses the storage area; wherein the Universal Verification Methodology test instance generates constrained random parameters and random controls and saves them to the storage area, and a software test instance reads the constrained random parameters and the random controls through the central processing unit and configures a test of the system on chip, and execution status information of the software test instance is stored in the storage area through the central processing unit and is read by the Universal Verification Methodology test instance.

2. The verification platform for the system on chip according to claim 1, wherein the execution status information comprises information on whether the software test instance is executed successful, information on whether there is an error during execution and corresponding error information, a feedback from the tested system on chip during execution, execution coverage of the software code, or any combination thereof.

3. The verification platform for the system on chip according to claim 1, wherein the system on chip comprises the central processing unit, a plurality of IP core modules and the bus, wherein each IP core module is connected to the bus respectively, and the central processing unit is connected to the bus.

4. The verification platform for the system on chip according to claim 3, wherein the bus function model unit and an IP core module are connected to the bus through a selection switch, and interface protocols of the bus function model unit and the IP core module are the same and conform to an interface protocol of the bus.

5. The verification platform for the system on chip according to claim 1, wherein the bus function model unit has an interface that conforms to the bus protocol and is directly connected to the bus.

6. The verification platform for the system on chip according to claim 1, wherein the Universal Verification Methodology test instance reads the execution status information, adjusts constraint condition for generating random parameters and random controls based on the execution status information to exclude scenarios that have been tested, and converts the execution status information into coverage data for coverage analysis.

7. A verification method for a system on chip, comprising:
generating, by an Universal Verification Methodology test instance, constrained random parameters and random controls, and storing them to a storage area in a bus function model unit;

reading, by a software test instance, the constrained random parameters and the random controls through a central processing unit, and configuring a test of the system on chip;

storing execution status information of the software test instance in the storage area; and reading, by the Universal Verification Methodology test instance, the execution status information, and adjusting constraint condition for generating random parameters and random controls based on the execution status information to exclude scenarios that have been tested.

8. The verification method for the system on chip according to claim 7, further comprising: converting the execution status information into coverage data for coverage analysis.

\* \* \* \* \*